Dec. 27, 1960    G. M. MARSH    2,965,999
FISHING FLOAT
Filed Aug. 8, 1957
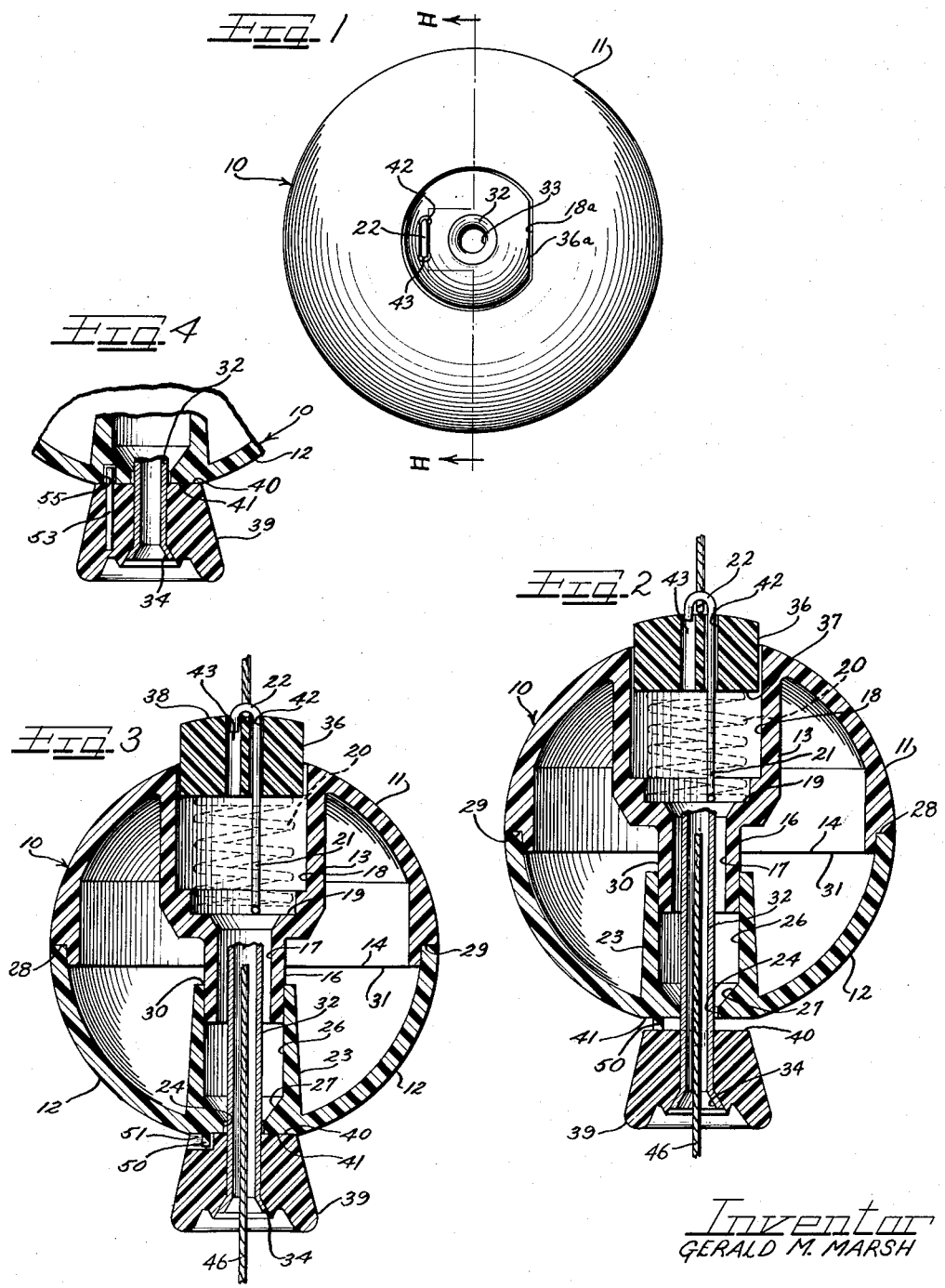
Inventor
GERALD M. MARSH
By Hill, Sherman, Meroni, Gross & Simpson
Attys United States Patent Office 2,965,999
Patented Dec. 27, 1960

2,965,999
FISHING FLOAT

Gerald M. Marsh, Liberty, Mo., assignor to Ideal Fishing Float Company, Inc., Richmond, Va., a corporation of Virginia Filed Aug. 8, 1957, Ser. No. 677,126

1 Claim. (Cl. 43—44.87)

This invention relates to improvements in floats for fishing and more particularly relates to an improved form of fishing float, which may be set in a fixed position along the length of a fishing line and which may also slide freely on the fishing line for casting.

The present invention is an improvement on the fishing floats described in applications Serial Nos. 471,985, now Patent No. 2,803,917, and 536,709, now Patent No. 2,888,774, filed by Frank R. Kimbrough on November 30, 1954, and on September 26, 1955, respectively.

A principal object of the present invention is to provide a readily attachable fishing float which may be fixedly connected along the length of a fishing line and which may be selectively adjusted to accommodate the float to freely slide along the line for casting.

A further object of the invention is to provide a novel and improved form of fishing float having a resilient line clamping arrangement, releasable from clamping engagement with the line and maintained in a released position with respect thereto by a simple manual operation.

Still another object of the invention is to provide an improved form of quick attachable type of fishing float in which a button on one end of the float is spring biased into clamping engagement with the line, in which an axially aligned release button controls the clamping of the line, and in which an interengaging connection is provided between the float and the release button maintaining the clamping button out of clamping engagement with respect to the line, and accommodating free movement of the float along the line.

These and other objects of the invention will appear from time to time as the following specification proceeds and with reference to the accompanying drawing wherein:

Figure 1 is a top plan view of a fishing float constructed in accordance with the principles of the present invention;

Figure 2 is a partial fragmentary cross-sectional view of the float shown in Figure 1, taken substantially along lines II—II of Figure 1 and showing the clamping means in its release position to accommodate free slidable movement of the float along the line;

Figure 3 is a view similar to Figure 2 and taken along the same section lines as Figure 2, but showing the line clamped to the float; and Figure 4 is a partial fragmentary sectional view illustrating a modified form in which my invention may be embodied.

In the embodiment of the invention illustrated in the drawings, a float 10 is shown as comprising two mating generally semispherical members 11 and 12, fitted together to form a hollow float body. The semispherical members 11 and 12 may be molded from a lightweight material such as a thermoplastic material or the like, and if desired, the float body may comprise two separate colors in accordance with conventional fishing float practice.

Referring first of all to the structural details of the semispherical member 11, it will be noted that an inwardly projecting boss 13 is located on a diametral axis of the semispherical member 11. The boss 13 extends beyond the peripheral edge 14 of the semispherical member 11 and terminates in a reduced diameter neck 16 having a bore extending therethrough indicated generally at 17.

The enlarged portion of the boss 13 nearest the outermost portions of the semispherical member 11 is counterbored as at 18. Between the bore 17 and the counterbore 18, there is provided a shoulder 19 bottoming one end of a coil spring 20.

The coil spring 20 is particularly characterized by the provision of a vertically bent wire 21 formed at one end thereof and extending generally axially with respect to the coiling axis of the spring 20 outwardly of the counterbore 18 and outwardly of the semispherical member 11. At the outer extremity of the wire 21 there is formed a reversely turned hook portion indicated at 22.

Referring now to the structural details of the semispherical member 12, it will be noted that an inwardly projecting boss 23 is provided having formed therein a bore 24 counterbored as at 26. A shoulder 27 is formed between the bore 24 and the counterbore 26.

The boss 23 terminates inside of the peripheral edge 28 of the semispherical member 12 and it will be noted that the counterbore 26 is sized to be complementary to the outside diameter of the reduced neck 16 formed on the boss 13, thereby to facilitate a telescoping assembly of the bosses 13 and 23 when the semispherical members 12 and 11 are fitted together.

The peripheral edge portions 14 of the semispherical member 11 are also provided with an annular recess 29 which seats the adjoining peripheral edge 28 of the semispherical member 12 and when fitted together, the mated semispherical members 11 and 12 form a spherical float body which is essentially watertight. To insure sealing against leakage of fluid into the interior of the float body, a plastic solvent may be placed in the interior of the float body prior to fitting the semispherical members 11 and 12 together to insure cohesion of joining and abutting surfaces at the joints indicated at 30 and 31, respectively.

Slidably and reciprocably supported in the bore 24 of the semispherical member 12 is a tubular member 32. In this particular embodiment, the tubular member 32 takes the form of a seamless tube made of a non-corrosive metal and having its opposite end portions flared as at 33 and 34, respectively.

The flared portion 33 facilitates assembly onto one end of the tubular member 32 of a first button or plunger indicated at 36. The button 36 is generally cylindrical in configuration and is sized to be complementary to the shape of the counterbore 18, thereby to be slidably received within the counterbore 18 in the manner of a piston or plunger slidable in a cylinder or sleeve. The button 36 has a flat 36a confronting a flat wall portion 18a of the recess 18 to accommodate slidable movement of said button along said recess but to prevent turning movement of said button.

The button 36 is provided with an end wall 37 disposed on a flat plane and abutting against the coils of the spring 20. The opposite end wall of the button 36 is indicated at 38 and it will be noted that this wall is contoured complementary to the spherical contour of the semispherical member 11.

At the other end of the tubular member 32, there is attached a second button or finger-manipulable handle indicated at 39. The button 39 is loosely connected to the tube 32 with the flared portion 34 for turning movement about said tube and is located outside of the float body with an end wall 40 abutting against an adjoining flattened wall portion 41 formed on the semi-spherical member 12.

The length of the tubular member 32 and the axial spacing dimension between the first and second buttons 36 and 39 is such that the coil spring 20 is preloaded. Moreover, the length of the wire 21 is selected so that the bight of the hook 22 on the extremity of the wire 21 will be received and seated on the curved wall 38 of the button 36. In this connection, it will be noted that the button 36 has a recess opening 42 formed therein through which the main portion of the wire 21 passes. A recess 43 is also formed in the curved wall 38 of the button 36 in spaced relation to the recess 42 and in this recess 43 the free end of the hook 22 is received and seated when the button 36 is spring-biased outwardly.

In assembled position, therefore, the button 36 is partially received within the counterbore 18 and a portion thereof projects outwardly of the float body. By grasping the second button 39 with the fingers, however, the entire plunger assembly including the button 39, the tubular member 32 and the first button 36 may be moved axially against the spring bias of the coil spring 20 so that the plunger or button 36 will be wholly received within the counterbore 18 of the boss 13. Such movement will result in a relative axial movement between the wire 21 and the button 36 and the hook 22 will be completely exposed, thereby facilitating clamping of a fishing line indicated at 46 under the hook 22 and against the curved wall 38 of the button 36.

A means is provided to space the bight of the hook 22 from the end wall 38 of the button 36 a distance sufficient to retain the float to the fishing line 46, but to accommodate free movement of the float along the fishing line at the selection of the fisherman.

This means is shown in the drawings as being an interengaging projection and recess connection between the button 39 and the semispherical member 12 which accommodates clamping of the fishing line to the button 36 when the parts are in interengagement with each other, and accommodates free slidable movement of the float along the fishing line when the parts are out of interengagement with each other, as when the button 39 is pulled outwardly and then turned to bring the parts out of registry with each other.

As shown in Figures 2 and 3, a projection 50, which may be the sprue of the casting forming the semispherical member 12, projects outwardly of the flattened wall portion 41 of the semi-spherical member 12 and is registrable with a recess 51 in the button 39, opening through the inner end face 40 thereof.

Thus upon grasping the button 39 by the hand and pulling outwardly on said button against the spring 20 and moving the inner end face 40 of said button outwardly beyond the end of the projection 50, and then turning the button 39 out of position to register the recess 51 with the projection 50, and then releasing said button to engage the end face 40 with the end of the projection 51, the bight of the hook 22 will be spaced outwardly of the outer end wall 38 of the button 36, and accommodate free slidable movement of the float 10 along the fishing line 46.

It should here be understood that the float 10 may be connected to the fishing line 46 merely by pulling on the button 39 an amount sufficient to open the hook 22 to accommodate the line to be trained through the bight portion thereof, without training the line through the sleeve or tubular member 32. As the button is released in position to register the recess 51 with the projection 50, the spring 20 will bias the button 36 to clamp the float in position on the fishing line. Then, when it is desired to cast and have the float freely slidable along the line, it is merely necessary to pull outwardly on button 39 to release the recess from the pin 51 and then turn the button 39 to engage the inner face with the end of the projection 50.

The fishing line may also be trained through the hollow interior portion of the tubular member 32 through the bight of the hook 22 and may be clamped to the float by engagement of the outer face 38 of the button 36 therewith, or the float may be freely slidable along the line by pulling outwardly on and turning of the button 39 in the previously described manner.

Except for the interengaging connection between the button 39 and the semispherical member 12, the embodiment of the invention illustrated in Figure 4 is like the embodiment of the invention illustrated in Figures 1, 2 and 3. For the sake of simplicity, only the modification of the invention will be shown, and like reference numerals will be applied, except as to the modified parts.

In the modification of the invention, the button 39 has a pin 53 extending from the inner face 40 thereof and registrable with a recess 55 in the semispherical member 12, and shown as opening through the flattened face 41 thereof. The pin 53 may be molded within the button 39 during the molding operation and retains the bight of the hook 22 in spaced relation with respect to the outer face 38 of the button 36, when the inner end of said pin is in engagement with the flattened face 41. The modification of the invention shown in Figure 4 is thus a reversal of parts of the form of the invention shown in Figure 3.

While I have herein shown and described several forms in which the invention may be embodied, it should be understood that various modifications and variations in the invention may be effected without departing from the spirit and scope of the novel concepts thereof.

I claim as my invention:

In a fishing float, a generally spherical hollow buoyant body, means providing a passageway extending axially through said body and sealed from the hollow interior thereof, first and second axially aligned buttons, said first button being slidably movable within said passageway, said second button being engageable with the wall of said body and being rotatable and axially movable with respect to said body, a sleeve extending axially of said passageway and connecting said buttons together to effect movement of said first button within the passageway upon axial movement of said second button in a direction away from the body, means biasing said first button outwardly of said body and said second button into engagement with said body, a wire within said body extending along said passageway slidably through said first button and retained from turning and axial movement with respect to said body, a recess in said first button in spaced relation with respect to said wire, the outer end of said wire being bent in the form of a hook and having a bight engageable with said button and a free end registrable with said recess, and a registerable projection and recess connection between said second button and said body registerable upon turning movement of said second button with respect to said body and spacing said second button in outwardly spaced relation with respect to said body when moved out of registry by pulling on said second button and by turning movement thereof and thereby spacing said first button out of engagement with the bight of said hook and accommodating said second button when in registry to engage the outer face of said body and said first button to engage the bight of said hook by the bias of said biasing means.

References Cited in the file of this patent

UNITED STATES PATENTS

| 1,259,664 | Peters | Mar. 19, 1918 |
| 2,601,736 | Fisher | July 1, 1952 |
| 2,787,079 | Wilson | Apr. 2, 1957 |
| 2,803,917 | Kimbrough | Aug. 27, 1957 |